March 31, 1953

J. NAAB 2,633,288

CONTROL VALVE

Filed Nov. 19, 1947

INVENTOR
JULIUS NAAB
BY
HIS ATTORNEY.

Patented Mar. 31, 1953

2,633,288

UNITED STATES PATENT OFFICE 2,633,288

CONTROL VALVE

Julius Naab, Easton, Pa., assignor to Ingersoll-Rand Company, New York, N. Y., a corporation of New Jersey Application November 19, 1947, Serial No. 786,839

8 Claims. (Cl. 230—13)

1

This invention relates to control valves, and more particularly to a cooling water stop valve for a compressor system.

It is the object of my invention to provide a control valve that is simple in construction, inexpensive to manufacture and efficient in operation.

Another object is to provide a means whereby the flow of two separate fluids are made mutually dependent.

A further object of the invention is to insure against possible mixing of the two said fluids.

Other objects and advantages will appear in the following detailed description.

In the accompanying drawings a preferred form of the invention is shown adapted to a particular combination, and similar numbers refer to similar parts.

Figure 1:
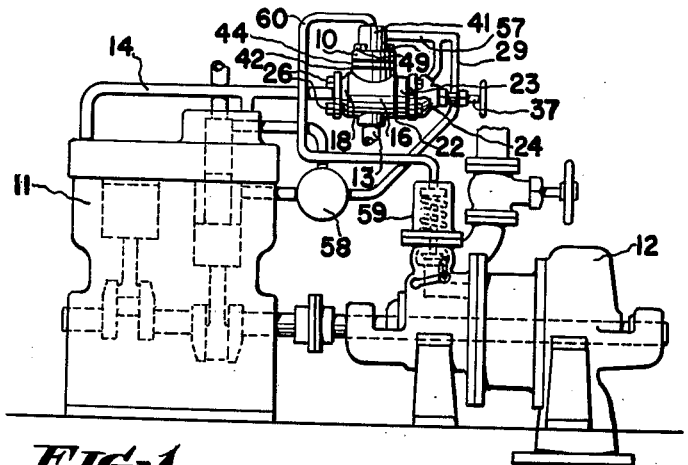
Figure 2:
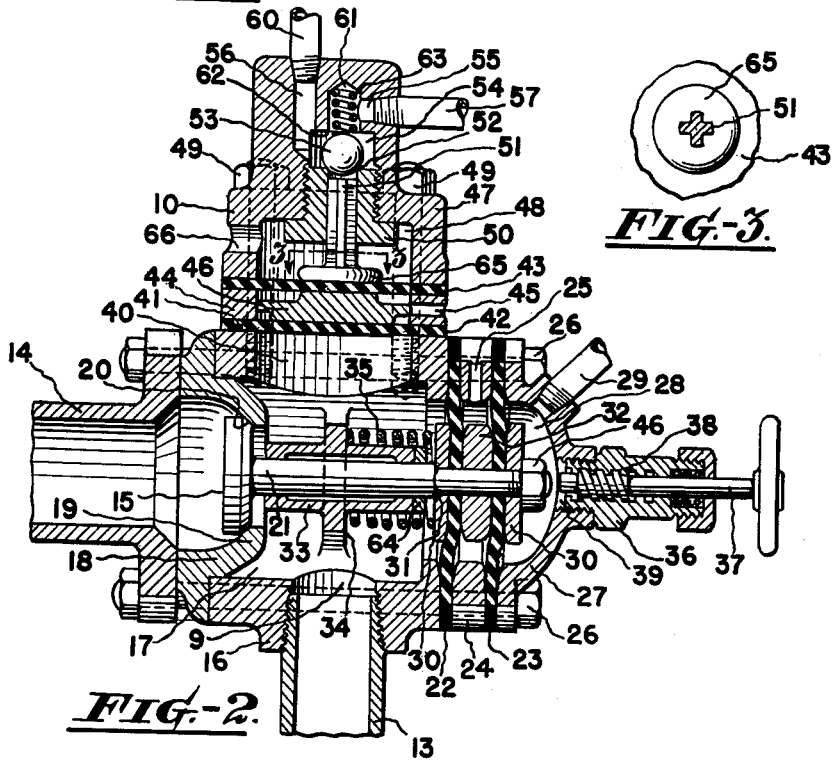
Figure 3:
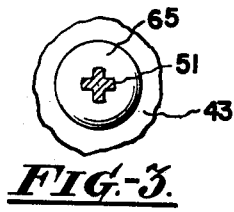

Figure 1 is a side elevation of the control valve adapted to a turbine driven compressor, Figure 2 is a longitudinal elevation, partly in section, of the control valve constructed in accordance with the invention, and Figure 3 is a transverse view taken through Figure 2 on the line 3—3.

Referring more particularly to the drawing, a control valve, designated in its entirety by 10, is adapted to a three stage compressor 11 driven by a turbine 12. In the present instance, cooling water is supplied from a source (not shown) to the control valve 10 by a conduit 13 and thence to a conventional water jacket (not shown) of the compressor by a conduit 14.

Interposed between the conduit 14 and a cylindrical section 16 of the control valve 10 is an end section 18 having an internal flange 19 extending into a chamber 17 in the section 16. Formed about the inner diameter of the internal flange 19 is a seating surface 20 which is engaged by the valve 15 to control communication between the conduits 13 and 14.

Seated on the end of the cylindrical section 16 opposite the end section 18 and encircling a stem 21 of the valve 15, is reciprocatory means in the form of a diaphragm 22 which acts responsively to water pressure in the chamber 17 to urge the valve 15 into closed position thereby preventing the flow of compressor cooling water. As a safety measure in the event of rupture of the diaphragm 22, a second diaphragm 23 is provided outwardly from the diaphragm 22 and held from contact therewith by a spacer ring 24. To permit immediate detection of any leakage of either diaphragm 22 or 23 an atmospheric port 25 is formed in the spacer ring 24.

2

Seated on the outer surface of the diaphragm 23 and held in firm relation thereto by bolts 26, is an end cover 27 which is recessed to form a chamber 28. This chamber accommodates pressure fluid, supplied thereto from the second stage intercooler 55 by a conduit 29, to press on the diaphragm 23 thereby actuating the valve 15 to establish communication between the conduits 13 and 14. To prevent leakage of fluid along the stem 21 at the points where it passes through the diaphragms 22 and 23, a washer 30 is provided on the outer surface of each diaphragm at such points and the innermost washer bears on a shoulder 31 disposed on the stem 21. A spacer disc 32 is positioned between the diaphragms 22 and 23 to hold the diaphragms in a spaced relation when the washers 30 are pressed into a sealing relation with the diaphragms by pressure exerted on the outermost disc 30 by a nut 46.

To allow proper action of the valve 15, its stem 21 is held in position by a guide sleeve 33 within the chamber 17 and an outwardly extended flange 34 on the sleeve seats a spring 35 that bears against the inmost washer 30 to act constantly to urge the valve 15 onto the seat 20 and thereby cut-off communication between the conduits 13 and 14. Manual operation of the valve 15 may be accomplished by any conventional means, such as a shaft housing 36 secured to the end cover 27 and designed to receive a rod 37 having a worm portion 38. Rotation of the rod 37 in one direction causes the rod to move through a hole 39, in the end cover, and against the valve stem 21 to force the valve 15 into the open position. Lateral motion of the valve in this direction is limited by the inmost washer abutting a perforated disc 64 which bears against one end of the guide sleeve 33. Reverse rotation of the rod causes it to retract from the end cover and allows the diaphragms 22 and 23 to be actuated by fluid pressures.

On the side of the cylindrical section 16 is an annular seating surface 41 on which bears a diaphragm 42 that is exposed to fluid pressure within the chamber 17 by a port 40 in the section 16. For the safety reasons previously discussed, a second diaphragm 43 is positioned outwardly of the diaphragm 42 and a space relation is maintained therebetween by a ring 44 having an atmospheric port 45. Movement of one of the diaphragms 42 or 43 is transmitted to the other diaphragm by a spacer disc 46 positioned between the diaphragms and movable therewith.

A ball valve housing 47 having a chamber 48, bears on the outer surface of the diaphragm 43 and is held in firm relation thereto by bolts 49 which claim the marginal portion of the diaphragms 42 and 43 and are threaded into the cylindrical section 16. Within the chamber 48 is a bushing 50 which provides a guide for a valve lifter 51 and a seating surface 52 for a ball 53 positioned in a recess 54 in the housing 47. An inlet and outlet port for the recess 54 is provided by the ports 55 and 56, respectively, which are formed in the housing 47. A conduit 57 leading from the port 55 to a second stage intercooler 58 serves to convey second stage pressure to the recess 54 and such pressure is communicated from the recess to a turbine cut-off valve 59 by a conduit 60.

Opposed to the seating surface 52 and extending upwardly from the mouth of the recess 54 is a spring-well 61, the mouth of which has a seating surface 62 formed therearound, adapted to receive a spring 63 which urges the ball 53 onto the seating surface 52. This action establishes communication between the conduits 57 and 60 thereby actuating the cut-off valve 59, or similar shut down device, for cutting off the power supply to the turbine. To break communication between the said conduits the ball 53 is urged upon the seating surface 62 by the valve lifter 51, the lower end of which has a flared portion 65 which rests on the diaphragm 43, whenever the water pressure exerted on the diaphragm 42 exceeds the pressure exerted by the spring 63. To relieve any fluid pressure which may be trapped in the conduit 60 by the ball 53 when seated upon the surface 62, a port 66 is provided in the housing 47 which communicates the conduit 60 with the atmosphere whenever the ball 53 is moved from the seat 52.

In the operation of the system, assuming that water under sufficient pressure to maintain adequate cooling of the compressor has been supplied to the control valve, the water pressure exerted on the diaphragm 42 and transmitted to the valve lifter, actuates the ball valve to cut-off communication between the conduits 57 and 60 thereby preventing the operation of the cut-off valve when the compressor builds up pressure. Second stage pressure built up in the intercooler 58 and exposed to the chamber 28, exerts sufficient force on the diaphragm 23 to overcome the spring 35 and the water pressure on the diaphragm 22 to actuate the valve 15 which establishes communication between the conduits 13 and 14 thereby allowing the flow of compressor cooling water.

In the event that the water pressure should fail or should drop to a value such that proper cooling of the compressor could not be maintained, the spring 63 urges the ball 53 from the seating surface 62 onto the seating surface 52 to permit the second stage pressure to actuate the cut-off valve 59 which shuts off the power supply of the turbine 12.

Under normal circumstances the compressor is completely unloaded whenever it is not in operation and, therefore, the cut-off valve 59 is preferably of the manually reset type to avoid restarting of the turbine when the second stage pressure falls below a value necessary to hold the said valve in the closed position.

From the foregoing description it becomes apparent that several advantages may be attained by the use of the control valve in combination with the turbine driven compressor, as for example economy in the use of cooling water and the prolonged life of the compressor. The economy of cooling water results, of course, in that the flow of such cooling water does not begin until shortly after the compressor is started and is shut off automatically when the compressor is stopped. This is advantageous where the supply of cooling water is limited. In any case it stops the flow of cooling water when the machine is not running and thereby avoids harmful condensation on the outer surface of the compressor. Also, the life of the compressor is extended by the use of the control valve in preventing operation of the compressor under conditions where the cooling water pressure is not sufficient to maintain adequate cooling of the compressor.

It is understood that modifications of the invention will occur to those skilled in the art and that the invention is limited only by the scope of the appended claims.

I claim:

1. A control valve for a pressure fluid system, comprising a housing having a pair of chambers and a recess with an inlet and an outlet, diaphragm means between said chambers, an inlet port and outlet port for one chamber, a port for the other chamber to constantly admit pressure fluid therein, a valve for the outlet port and actuated by the diaphragm means acting responsively to a pressure differential between the chambers, and valve means actuated by fluid pressure in the chamber having said inlet port and outlet port for controlling the flow of pressure fluid through the recess.

2. A control valve for a pressure fluid system, comprising a housing having a pair of chambers and a recess with an inlet port and an outlet port, diaphragm means between the chambers and acting responsively to a pressure differential therebetween, a port in one chamber to constantly admit pressure fluid thereinto, a valve in the other chamber for controlling the flow of pressure fluid therethrough and actuated by the diaphragm means, a valve for controlling the flow of pressure fluid through the recess, and diaphragm means actuated by fluid pressure in the said other chamber to actuate the second said valve.

3. A control valve for a pressure fluid system, comprising a housing defining a chamber having a pressure fluid inlet and outlet and a second chamber having a port and a recess having a pressure fluid inlet and an outlet, a diaphragm separating said chambers and exposed thereto, a valve in one of said chambers actuated by said diaphragm for controlling the flow of pressure fluid through the first said chamber, a second diaphragm exposed to the first said chamber, means for communicating the port of the second said chamber with said recess, and a valve actuated by the said second diaphragm for controlling the flow of pressure fluid through the recess.

4. A control valve for a liquid cooled compressor driven by a motor provided with a pressure fluid operated shut-down mechanism; comprising a housing having a chamber for connection in a cooling liquid supply line for the compressor, a chamber for connection to the discharge of the compressor and a recess having an inlet and an outlet for connection in a pressure fluid supply line for said mechanism; a valve in the first said chamber for controlling the flow of cooling liquid therethrough; means responsive to variations in pressure differential between said chambers for actuating said valve; and a valve in said recess responsive to variations in liquid pressure in the first said chamber for controlling the flow of pressure fluid through said recess.

5. In combination with a liquid cooled compressor, a motor to drive the compressor, and a shut-down mechanism for said motor, a control valve comprising a valve adapted to be connected in the cooling water supply line for the compressor, means responsive to the compressor discharge pressure for actuating said valve to permit the flow of compressor cooling water when the compressor is operating and to stop such flow when the compressor is shut down, and means responsive to cooling water pressure for operating said shut-down mechanism whenever the cooling liquid pressure falls below a predetermined value.

6. In combination with a liquid cooled compressor, a motor for driving the compressor, and a pressure fluid actuated mechanism to regulate the motor, a control valve comprising a housing provided with a recess having a pressure fluid inlet and an outlet and a chamber having a cooling liquid inlet and outlet, valve in the chamber, means in the housing acting responsively to fluid pressure of the compressor to actuate said valve for controlling the flow of cooling liquid through the chamber to the compressor, and valve means for the recess acting responsively to cooling liquid pressure controlling the flow of pressure fluid through said recess to said mechanism.

7. The combination of a water cooled compressor, a motor for driving the compressor, a pressure fluid actuated mechanism to regulate the motor, and a control valve comprising a housing having a chamber connected in the cooling water line of the compressor and a second chamber in communication with the compressor discharge and a recess having an inlet and outlet connected in the pressure fluid supply line for said mechanism, reciprocatory means between said chambers, a valve in one of said chambers actuated by said means to control the flow of compressor cooling water, and valve means for said recess acting responsively to cooling water pressure to control the flow of pressure fluid through the recess to said mechanism.

8. In combination with a water cooled compressor, a motor for driving the compressor, and a pressure fluid actuated mechanism for regulating the supply of power to the motor, a control valve including a housing having a pair of chambers and a recess therein, one of said chambers being connected in the water supply line for the compressor, the other of said chambers being in communication with a discharge portion of the compressor, and said recess being connected in series between said mechanism and a pressure fluid discharge portion of the compressor, a valve in the first said chamber for controlling the flow of fluid therethrough, piston means between said chambers and actuated in response to variations in pressure differential therebetween for actuating said valve, a valve in the recess to control the flow of pressure fluid to said mechanism, and piston means responsive to water pressure in the first said chamber for actuating the last said valve.

JULIUS NAAB.

REFERENCES CITED

The following references are of record in the file of this patent:

UNITED STATES PATENTS

| Number | Name | Date |
| --- | --- | --- |
| 231,214 | Curtis | Aug. 17, 1880 |
| 948,471 | Austin | Feb. 8, 1910 |
| 1,483,044 | Hoffman et al. | Feb. 5, 1924 |
| 1,603,495 | Rix | Oct. 19, 1926 |
| 1,797,688 | Valley | Mar. 24, 1931 |
| 2,272,815 | Otto | Feb. 10, 1942 |
| 2,371,345 | Monroe et al. | Mar. 13, 1945 |